(12) United States Patent
Bhagat et al.

(10) Patent No.: US 11,413,591 B2
(45) Date of Patent: Aug. 16, 2022

(54) PREPARING AND DISPENSING POLYMER MATERIALS AND PRODUCING POLYMER ARTICLES THEREFROM

(71) Applicant: Magic Leap, Inc., Plantation, FL (US)

(72) Inventors: Sharad D. Bhagat, Austin, TX (US); Vikramjit Singh, Pflugerville, TX (US); Christophe Peroz, San Francisco, CA (US); Chieh Chang, Cedar Park, TX (US)

(73) Assignee: Magic Leap, Inc., Plantation, FL (US)

( * ) Notice: Subject to any disclaimer, the term of this patent is extended or adjusted under 35 U.S.C. 154(b) by 947 days.

(21) Appl. No.: 16/176,337

(22) Filed: Oct. 31, 2018

(65) Prior Publication Data

US 2019/0126223 A1 May 2, 2019

Related U.S. Application Data

(60) Provisional application No. 62/580,842, filed on Nov. 2, 2017.

(51) Int. Cl.
*B01F 35/00* (2022.01)
*B01F 35/221* (2022.01)
(Continued)

(52) U.S. Cl.
CPC .......... *B01F 35/2211* (2022.01); *B01F 23/29* (2022.01); *B01F 23/49* (2022.01);
(Continued)

(58) Field of Classification Search
CPC .. B01F 35/7176; B01F 23/29; B01F 35/2136; B01F 23/49; B01F 35/512; B01F 2035/99; C08G 75/045
See application file for complete search history.

(56) References Cited

U.S. PATENT DOCUMENTS

| 4,990,364 A | 2/1991 | Bolte et al. |
| 5,876,805 A | 3/1999 | Ostile |

(Continued)

FOREIGN PATENT DOCUMENTS

| CN | 101422774 A | 5/2009 |
| CN | 101441282 A | 5/2009 |

(Continued)

OTHER PUBLICATIONS

EP Extended European Search Report in Appln. No. 18874477.5, dated Nov. 12, 2020, 11 pages.

(Continued)

*Primary Examiner* — Anshu Bhatia
(74) *Attorney, Agent, or Firm* — Fish & Richardson P.C.

(57) ABSTRACT

An example system is used to mix components and dispense a mixture for forming a thiol-ene polymer article. The system includes a first reservoir containing a first component of the thiol-ene polymer including a first polymerizable compound, and a second reservoir containing a second component of the thiol-ene polymer including a second polymerizable compound. The system also includes a mixing vessel having a mixing chamber, a delivery manifold providing a conduit for fluid from the first and second reservoirs to the mixing vessel, and a dispensing manifold providing a conduit for fluid from the mixing vessel. The system also includes a control module programmed to control the operation of the system.

15 Claims, 9 Drawing Sheets

(51) Int. Cl.

| | | |
|---|---|---|
| *C08G 77/60* | (2006.01) | |
| *B29B 7/28* | (2006.01) | |
| *B29B 7/00* | (2006.01) | |
| *B29B 7/16* | (2006.01) | |
| *B29B 7/14* | (2006.01) | |
| *B29B 7/24* | (2006.01) | |
| *B29B 7/22* | (2006.01) | |
| *B01F 23/20* | (2022.01) | |
| *B01F 23/40* | (2022.01) | |
| *B01F 23/70* | (2022.01) | |
| *B01F 35/90* | (2022.01) | |
| *B01F 35/512* | (2022.01) | |
| *B01F 35/21* | (2022.01) | |
| *B01F 35/71* | (2022.01) | |
| *B29B 7/86* | (2006.01) | |
| *B29B 7/82* | (2006.01) | |
| *C08G 75/045* | (2016.01) | |

(52) U.S. Cl.
CPC ........ *B01F 23/708* (2022.01); *B01F 35/2136* (2022.01); *B01F 35/512* (2022.01); *B01F 35/7176* (2022.01); *B01F 35/90* (2022.01); *B29B 7/00* (2013.01); *B29B 7/14* (2013.01); *B29B 7/16* (2013.01); *B29B 7/22* (2013.01); *B29B 7/244* (2013.01); *B29B 7/283* (2013.01); *B29B 7/286* (2013.01); *C08G 77/60* (2013.01); *B01F 2035/99* (2022.01); *B29B 7/82* (2013.01); *B29B 7/86* (2013.01); *C08G 75/045* (2013.01)

(56) References Cited

U.S. PATENT DOCUMENTS

| | | | |
|---|---|---|---|
| 10,828,855 | B2 | 11/2020 | Bhagat et al. |
| 2002/0090470 | A1 | 7/2002 | Kubota et al. |
| 2003/0004229 | A1 | 1/2003 | Schermacher et al. |
| 2008/0055929 | A1 | 3/2008 | Kubota et al. |
| 2010/0072643 | A1 | 3/2010 | Pugh et al. |
| 2010/0104852 | A1 | 4/2010 | Fletcher et al. |
| 2011/0071252 | A1 | 3/2011 | Prince et al. |
| 2011/0244131 | A1 | 10/2011 | Kawamura et al. |
| 2012/0286435 | A1 | 11/2012 | Bojkova et al. |
| 2014/0117397 | A1 | 5/2014 | Saeki et al. |
| 2015/0056413 | A1 | 2/2015 | Hwang et al. |
| 2015/0079793 | A1 | 3/2015 | Hattori et al. |
| 2015/0165671 | A1 | 6/2015 | Im et al. |
| 2016/0009029 | A1 | 1/2016 | Cohen et al. |
| 2016/0108315 | A1 | 4/2016 | Matsuyama et al. |
| 2016/0109799 | A1 | 4/2016 | Hernandez et al. |
| 2016/0136889 | A1 | 5/2016 | Rolland et al. |
| 2016/0164261 | A1 | 6/2016 | Warren |
| 2017/0022300 | A1* | 1/2017 | Hirahara .................... C08F 2/01 |
| 2018/0056614 | A1 | 3/2018 | Bhagat et al. |
| 2020/0156311 | A1* | 5/2020 | Rolland ................ B29C 64/314 |
| 2021/0031472 | A1 | 2/2021 | Bhagat et al. |

FOREIGN PATENT DOCUMENTS

| | | | |
|---|---|---|---|
| CN | 102019662 A | | 4/2011 |
| CN | 102119344 A | | 7/2011 |
| CN | 107107168 A | | 8/2017 |
| JP | 2003-103531 A | | 4/2003 |
| JP | 2008-265001 A | | 11/2008 |
| JP | 2011-084060 A | | 4/2011 |
| JP | 2012-049152 A | | 3/2012 |
| JP | 2012071556 A | | 4/2012 |
| JP | 2014-152194 A | | 8/2014 |
| JP | 2016-107522 A | | 6/2016 |
| WO | 2012/002446 A1 | | 1/2012 |
| WO | 2013/151151 A1 | | 10/2013 |
| WO | WO 2016/204605 | | 12/2016 |
| WO | 2016114362 A1 | | 4/2017 |
| WO | WO 2018/039323 | | 3/2018 |

OTHER PUBLICATIONS

CN Office Action in Chinese Appln. No. 201880085062.3, dated Jun. 28, 2021, 18 pages (with English translation).

PCT International Search Report in International Appln. No. PCT/US18/58366, dated Oct. 31, 2018, 2 pages.

Mercene Labs Ostemer 324 Flee Sep. 20, 2016 (Sep. 20, 2016) p. 1 para[0002]-[0003], [0006]; p. 2 para[0001]; p. 1 Figure; p. 2 Table; Retrieved from https://www.ostemers.com/wp-content/uploads/2016/11/Data-sheet-OSIEMER-324-Flex.pdf on Dec. 20, 2018 (Dec. 20, 2018).

* cited by examiner

PREPARING AND DISPENSING POLYMER MATERIALS AND PRODUCING POLYMER ARTICLES THEREFROM

CROSS-REFERENCE TO RELATED APPLICATION

This application claims the benefit of the filing date of U.S. Provisional Application No. 62/580,842, filed on Nov. 2, 2017. The contents of U.S. Application No. 62/580,842 are incorporated herein by reference in their entirety.

TECHNICAL FIELD

This disclosure relates to systems and methods preparing and dispensing polymer materials and for producing polymer articles, such as optical polymer films, therefrom.

BACKGROUND

Polymer articles can be used in a variety of products. As an example, optical systems, such as wearable imaging headsets, can include one or more polymer film eyepieces that present projected images to a user. In some cases, polymer film eyepieces can be used as a part of virtual reality (VR) or augmented reality (AR) systems.

In many applications, homogeneity of the polymer material is important. For example, where polymer articles are used in optical systems, inhomogenieties in the polymer material can introduce undesirable variations in the optical properties of the article. Inhomogeneities in composition can also lead to physical deformation of the article (e.g., due to irregular curing and/or warping), which in turn may affect the optical performance of the article. Inhomogeneities in a polymer material forming a grating structure for an eyepiece, as an example, can give rise to undesirable effects such as light scattering, delamination, as well as reduced performance of optical structures (e.g., grating structures).

SUMMARY

System and techniques for mixing and dispensing mixtures for forming polymer articles, such as optical polymer film, are described herein. Described implementations can be used to prepare and dispense controlled volumes of highly homogeneous materials. The dispensed materials can be used to produce polymer articles (e.g., molded optical components) in a highly precise, controlled, and reproducible manner. The resulting polymer articles can be used in a variety of variation-sensitive applications (e.g., as a part of eyepieces in an optical imaging system).

In some implementations, polymer articles can be produced such that the production conditions are precisely regulated. As an example, polymer articles can be produced using specific amounts of constituent materials (e.g., polymer precursor materials, such as monomer and/or oligomer materials) stored under specific physical conditions (e.g., specific concentrations, temperatures, viscosities, etc.). Further, the constituent materials can be combined in a precisely regulated manner (e.g., at a specific rate, under specific physical conditions, etc.). This precise regulation can provide precise volumes of highly homogenous mixtures under conditions (e.g., temperature, pressure, viscosity) such that the mixtures are suitable for molding polymer articles with extremely small, precise features. Accordingly, the implementations disclosed herein can be used for repeatedly forming polymer articles that exhibit predictable and precise physical and/or optical properties. For example, polymer films produced in this manner can diffract light in a more predictable and consistent manner, and thus, may be more suitable for use in a high resolution optical imaging system. In some cases, optical imaging systems using these polymer films can produce sharper and/or higher resolution images than might otherwise be possible with other polymer films. Moreover, production of such polymer films using the disclosed systems and techniques can offer higher yields with less production line downtime (e.g., for cleaning and maintenance) than conventional techniques.

In an aspect, a system is configured to mix components and dispense a mixture for forming a thiol-ene polymer article. The system includes a first reservoir containing a first component of the thiol-ene polymer including a first polymerizable compound, and a second reservoir containing a second component of the thiol-ene polymer including a second polymerizable compound. The system also includes a mixing vessel having a mixing chamber, a delivery manifold providing a conduit for fluid from the first and second reservoirs to the mixing vessel, and a dispensing manifold providing a conduit for fluid from the mixing vessel. The system also includes a control module in communication with the delivery manifold and the dispensing manifold. The control module is programmed to cause the delivery manifold to deliver a metered amount of the first component from the first reservoir and a metered amount of the second component from the second reservoir into the mixing chamber of the mixing vessel to form a mixture under conditions sufficient to cause a chemical reaction between the first and second polymerizable compounds, and such that a viscosity of the mixture increases over time. The control module is also programmed, during operation of the system to cause the dispensing manifold to dispense the mixture from the mixing vessel into a mold while the mixture's viscosity is below 1000 mPa·s.

Implementations of this aspect can include one or more of the following features.

In some implementations, the system can further include one or more additional reservoirs each containing a corresponding component of the thiol-ene polymer. Each reservoir can be connected to the mixing vessel by the delivery manifold. The control module can be further programmed to cause the delivery of a metered amount of each of the components of the thiol-ene polymer from their corresponding reservoir to the mixing chamber to form the mixture during operation of the system.

In some implementations, the control module can be programmed to cause the delivery manifold to sequentially deliver each of the components to the mixing chamber.

In some implementations, the control module can be programmed to cause the delivery manifold to deliver the first and second components to the mixing chamber before delivering any additional components.

In some implementations, the control module can be programmed to cause the delivery manifold to simultaneously deliver each of the components to the mixing chamber.

In some implementations, the mixing chamber can have a hydrophobic surface.

In some implementations, the hydrophobic surface can be provided by a layer of PTFE, polypropylene, polydimethylsiloxane, fluorosilane polymers, micro-textured polycarbonate, or parylene.

In some implementations, the hydrophobic surface can be provided by a layer of a silicone material.

In some implementations, the mixing vessel can include a surface formed from a material including a compound having at least one non-polar alkyl group, at least one non-polar aryl group, at least one non-polar fluoride group, or a combination thereof.

In some implementations, the system can further include a gas reservoir connected to the mixing vessel by the delivery manifold. The control module can be further programmed to cause the delivery of a gas from the gas reservoir to the mixing chamber during operation of the system.

In some implementations, the system can further include a solvent reservoir connected to the mixing vessel by the delivery manifold. The control module can be further programmed to cause the delivery of a solvent from the solvent reservoir to the mixing chamber during operation of the system.

In some implementations, the mixing vessel can include an agitator for facilitating mixing of the mixture during operation of the system.

In some implementations, the control module can be in communication with the agitator and can be programmed to control the operation of the agitator during operation of the system.

In some implementations, the delivery manifold can include a filtration subsystem arranged to filter the first and/or second components prior to their delivery into the mixing chamber.

In some implementations, the dispensing manifold can include a filtration subsystem arranged to filter the mixture prior to dispensing the mixture into the mold.

In some implementations, the system can further include a heater arranged to maintain a temperature in the mixing chamber within a range from −40° C. to 400° C.

In some implementations, the system can further include a pump arranged to maintain a pressure differential in the mixing chamber of approximately 10 kPa to 500 kPa.

In another aspect, a method of making a molded thiol-ene polymer article includes providing a first component of the thiol-ene polymer including a first polymerizable compound, and providing a second component of the thiol-ene polymer including a second polymerizable compound. The method also includes forming a batch of a mixture including metered amounts of the first and second components in a mixing vessel under conditions sufficient to cause a chemical reaction between the first and second polymerizable compounds in the mixture such that a viscosity of the mixture increases over time. The method also includes, while the mixture's viscosity is below 1000 mPa·s, dispensing the mixture from the mixing vessel into a mold. The method also includes curing the mixture in the mold to provide the molded thiol-ene polymer article.

Implementations of this aspect can include one or more of the following features.

In some implementations, the method can further include flushing the mixing vessel to remove residue of the mixture after dispensing the mixture.

In some implementations, the method can further include forming a second batch of the mixture including metered amounts of the first and second components in the mixing vessel under conditions sufficient to cause a chemical reaction between the first and second polymerizable compounds in the mixture such that a viscosity of the mixture increases over time. The method can further include, while the mixture's viscosity is below 1000 mPa·s, dispensing the mixture from the mixing vessel into the mold. The method can also include curing the mixture in the mold to provide a second molded thiol-ene polymer article In some implementations, the method can further include providing a third component of the thiol-ene polymer. Forming the mixture can include combining a metered amount of the third component with the first and second components in the mixing vessel.

In some implementations, forming the batch of the mixture under conditions sufficient to cause the chemical reaction can include maintaining the mixing vessel at a temperature within a range from −40° C. to 400° C.

In some implementations, forming the batch of the mixture under conditions sufficient to cause the chemical reaction can include maintaining the mixing vessel at a pressure differential of approximately 10 kPa to 500 kPa.

In some implementations, dispensing the mixture can include coating at least a portion of the mold with the mixture.

In some implementations, the thiol-ene polymer can have a refractive index of 1.55 or more.

The details of one or more embodiments are set forth in the accompanying drawings and the description below. Other features and advantages will be apparent from the description and drawings, and from the claims.

DETAILED DESCRIPTION

Figure 1:
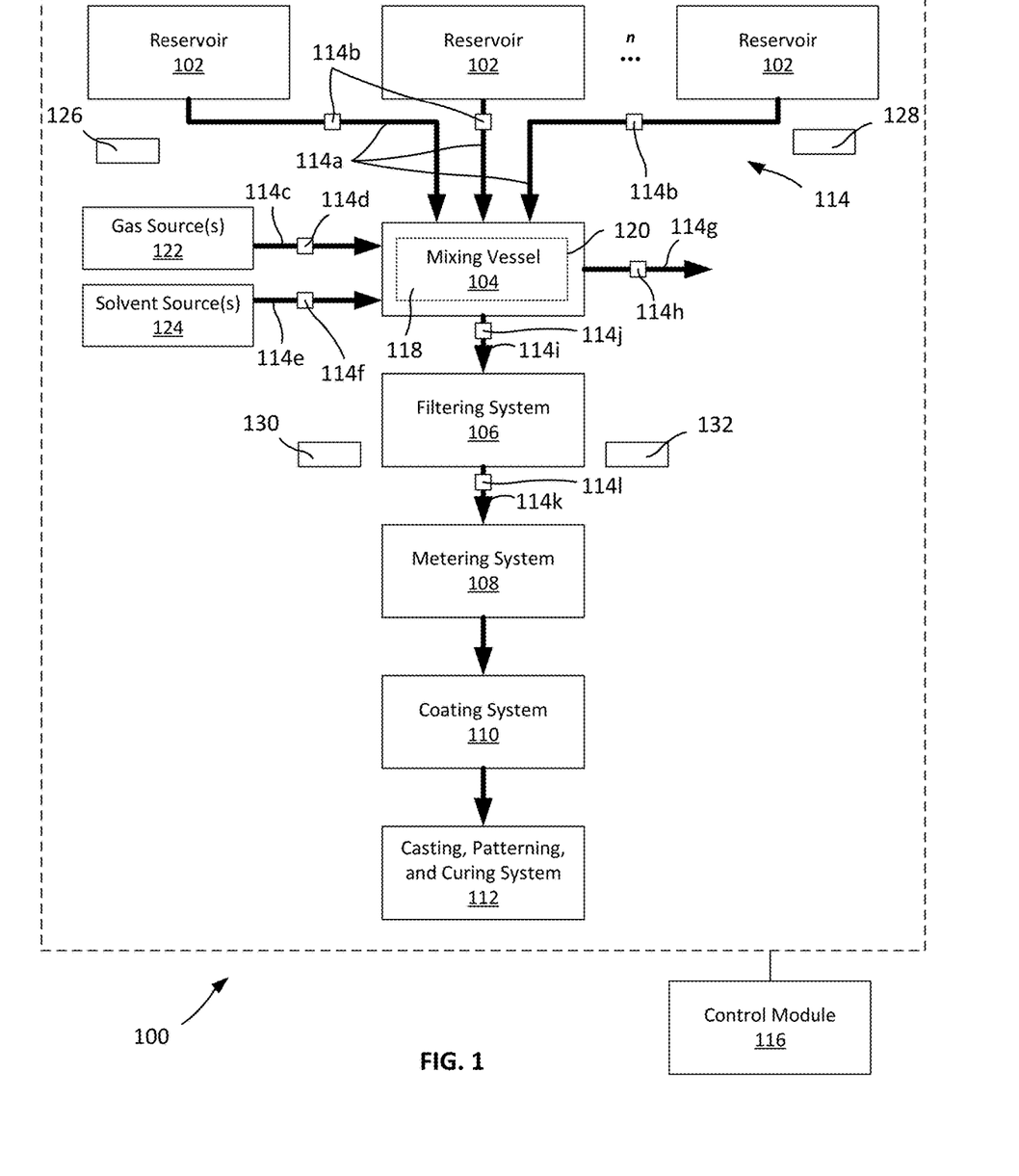
FIG. 1 is a schematic diagram of a system for producing polymer articles

An example system 100 for producing polymer articles in shown in FIG. 1. Implementations of the system 100 can be used to produce polymer articles, such as optical polymer films, using photocurable materials (e.g., photopolymers or light-activated resins that hardens when exposed to light).

The system 100 includes reservoirs 102, a mixing vessel 104, a filtering system 106, a metering system 108, a coating system 110, and a casting, patterning, and curing system 112. The system 100 also includes a delivery manifold 114 that provides fluid communication between interconnected components. The system 100 also includes a control module 116 to control the operation of the system 100 and each of its constituent components.

The reservoirs 102 store constituent materials for producing polymer articles. In some cases, a reservoir 102 includes a fluid-tight chamber, such as a vessel, a tank, a vat, a pool, or some other chamber for securely storing fluid materials.

Various materials can be stored within the reservoirs 102. For instance, some polymers can be produced by combining two or more materials that polymerize when mixed and/or when exposed to light (e.g., precursors containing monomers and/or oligomers, such as an ene monomer and a corresponding thiol monomer that polymerize into a thiol-ene polymer). Each of the reservoirs 102 can store a particular material, such that the materials are kept separate and do not pre-maturely polymerize.

Figure 7:
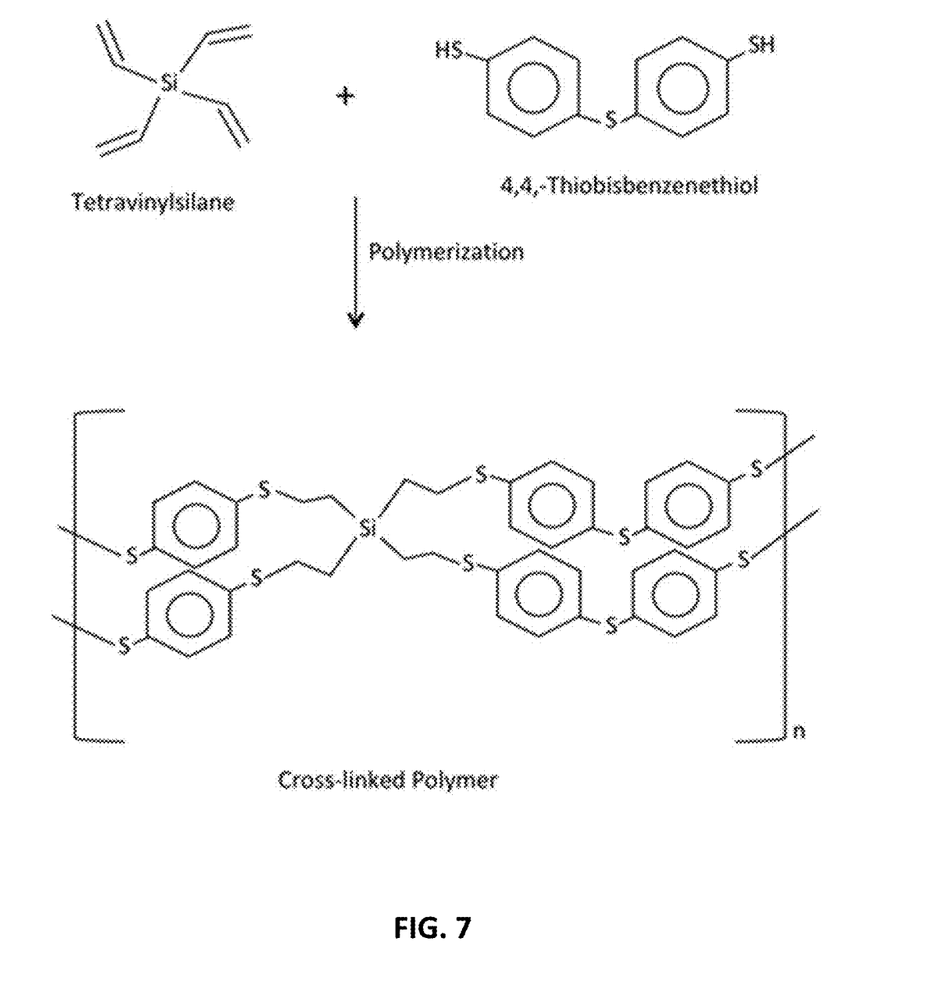
FIG. 7 is a diagram of an example polymerization reaction.

In some cases, one of the reservoirs 102 can store an ene monomer, and another one of the reservoirs 102 can store a corresponding thiol monomer. As an example, one of the reservoirs 102 can store 4,4-Thiobisbenzenethiol, and another one of the reservoirs 102 can store Tetravinylsilane (an example cross-polymerization reaction of which is shown in FIG. 7). As another example, one of the reservoirs 102 can store 1,3-Benzenedithiol (a thiol monomer), and another one of the reservoirs 102 can store Tetravinylsilane (an ene monomer). As an example, one of the reservoirs 102 can store 1,3-Benzenedithiol (a thiol monomer), and another one of the reservoirs 102 can store Tetravinylsilane (an ene monomer). As another example, one of the one of the reservoirs 102 can store 1,3-Benzenedithiol, and another one of the reservoirs 102 can store 1,3,5-Triallyl-1,3,5-triazine-2,4,6(1H,3H,5H)-trione. As another example, one of the reservoirs 102 can store 1,2,4,5-Benzenetetrathiol, and another one of the reservoirs 102 can store Tetravinylsilane. As another example, one of the reservoirs 102 can store 1,3,4-Thiadiazole-2,5-dithiol, and another one of the reservoirs 102 can store Tetravinylsilane. Although example combinations of materials are described above, these are merely illustrative examples. Other combinations of materials also can be used, either instead of in addition to those described above.

Further, the reservoirs 102 can contain addition materials that facilitate the production of molded thiolene or other polymer articles. For example, one or more of the reservoirs 102 can contain photo-initiator/sensitizers (e.g., to initiate photopolymerization), inhibitors (e.g., to reduce or otherwise control a polymerization rate), UV absorbers (e.g., to reduce UV damage to the polymer material), and/or anti-oxidants (e.g., to reduce oxidation of the polymer material).

Example materials are described in U.S. Pat. App. No. 62/502,973, filed May 8, 2017, the contents of which are incorporated herein in their entirety.

The storage conditions within each reservoir 102 can be individually controlled. For example, in some cases, the storage temperature of each reservoir 102 can be regulated using a temperature control assembly 126 (e.g., a refrigeration unit and/or a heating unit). As another example, in some cases, the storage pressure of each reservoir 102 can be regulated using a pressure control system 128 (e.g., a vacuum assembly, a compressor assembly, and/or a valve assembly that regulates the pressure within a reservoir 102). In some cases, the temperature of one or more of the reservoirs 102 can maintained in a range from −20° C. to 50° C. In some cases, the storage pressure of one or more of the reservoirs 102 can be maintained in a range from 50 kPa to 200 kPa.

Regulating the storage conditions within each reservoir 102 can provide various benefits. In some cases, materials stored according to specific conditions can be stored for longer periods of time without degrading, and can be used to produce polymer articles in a more consistent manner. For example, the materials can be used to produce polymer articles having fewer variations or inhomogeneities. As another example, the materials can be stored between manufacturing runs without negatively impacting the consistency of the produced polymer articles between runs, thereby reducing material spoilage or waste. In some cases, materials stored according to specific conditions can be dispensed more easily. For example, the materials can have a particular viscosity or range of viscosities that enable the materials to be dispensed from a reservoir 102 more quickly and/or without requiring a large degree of pressure or force.

As an example, a first type of constituent material (e.g., a first type of monomer) is ideally stored in a first temperature range (e.g., between 5° C. and 10° C.) and is ideally heated prior to use (e.g., heated to room temperature). As another example, a second type of constituent material (e.g., a second type of monomer) is solid at room temperature, and must be melted prior to use (e.g., heated to 40° C. to 50° C.). Two different reservoirs can be used to store, heat, cool, and/or dispense each constituent material independently, such the materials are stored and used under their respective ideal conditions.

As shown in FIG. 1, the system 100 can include multiple reservoirs 102 (e.g., two, three, four, or more). In some cases, each reservoir 102 can store a different material. In some cases, two or more reservoirs 102 can store the same material (e.g., to provide redundancy and/or to expand the storage capacity of the system 100). In some cases, two or more reservoirs can store the same material, but according to different storage conditions (e.g., different storage temperature, pressure, volume, etc.).

The system 100 dispenses metered amounts of material from the reservoirs 102 into the mixing vessel 104. It can be important to dispense accurate amounts of each constituent material to ensure that reagents are mixed in appropriate ratios to ensure uniform mixing and cure of the polymer material. In some cases, materials can be dispensed from the reservoirs 102 into the mixing vessel 104 according to a specific molar ratio. For example, a particular amount of material from one reservoir 102 (e.g., a ene monomer) and a particular amount of material from another reservoir 102 (e.g., a corresponding thiol monomer) can be dispensed into the mixing vessel 104, such that the molar ratio between the ene monomer and the thiol monomer in the mixing vessel is between 1:1.5 to 1:2.20. This can be useful, for example, in producing photocurable polymers that are particularly suitable for use as eyepieces in optical imaging systems (e.g., highly cross-linked polymers having particularly suitable mechanical properties and/or optical properties, such as a refractive index of 1.55 or more.). Other molar ratios are also possible, depending on the implementation.

The dispensing of materials from the reservoirs 102 can be regulated using the delivery manifold 114. For example, the delivery manifold 114 can include conduits 114a (e.g., pipes, tubes, feed lines, etc.) extending between the reservoirs 102 and the mixing vessel 104, and valves 114b positioned along the conduits 114a. The system 100 can selectively actuate the valves 114b (e.g., open or close the valves 114b) to regulate the flow of materials from the reservoirs 102 into the mixing vessel 104. In some cases, the delivery manifold 114 can regulate the volume of material that is dispensed from each reservoir 102, and the rate at which the materials are dispensed.

In some cases, the delivery manifold 114 can be operated to deliver materials into the mixing vessel 104 is a particular order. For example, in some cases, one or more materials can be initially dispensed into the mixing vessel 104, followed by one more other materials in a sequence. In some cases, the delivery manifold 114 can be operated to deliver one or more materials into the mixing vessel 104 simultaneously or substantially simultaneously. This enables materials to be mixed in a regulated manner, such that the interaction between materials is closely controlled. In some cases, this can improve the consistency of the resulting polymer articles.

The mixing vessel 104 is configured to combine constituent materials from the reservoirs 102 to form a mixture. The mixing vessel 104 includes an inner mixing chamber 118, into which materials from the reservoirs 102 are directed.

In some cases, the interior surfaces 120 of the mixing chamber 118 can be coated with one or more layers of material that facilitate efficient transfer of material into and out of the mixing chamber 118. For example, the interior surfaces 120 can be coated with one or more hydrophobic materials (e.g., polytetrafluoroethylene (PTFE), polypropylene, polydimethylsiloxane, fluorosilane polymers, microtextured polycarbonate, or parylene). As another example, the interior surfaces 120 can be coated with a silicon-based material, such as polydimethylsiloxane (PDMS). As another example, the interior surfaces 120 can be coated with a compound that includes at least one non-polar alkyl group, at least one non-polar aryl group, at least one non-polar fluoride group, or combinations thereof. These coatings can be beneficial, for example, in reducing the likelihood that materials stick or cling to the interior surfaces 120.

Coating the interior surfaces of the mixing chamber can provide various benefits. In some cases, this can improve the efficiency of the production process. For example, coating the interior surfaces can reduce the amount of material that is stuck or retained in the mixing chamber 118, thereby reducing material waste and increasing production yield. As another example, this can decrease production line downtime (e.g., by reducing cleaning and maintenance requirements). In some cases, this can improve the consistency of the production process. For example, as materials are less likely to be retained in the mixing chamber between production runs, the likelihood of cross-contamination is reduced. Thus, polymer articles can be formed having predictable and precise physical and/or optical properties, even across different manufacturing runs.

The delivery manifold 114 can also introduce one or more gases or solvents into the mixing chamber 118 of the mixing vessel 104. This can be useful, for example, in introducing additional materials into the mixing chamber 118 to facilitate mixing, polymerization, or other aspects of the production process and/or to clean the mixing vessel 104 between uses.

For instance, as shown in FIG. 1, the delivery manifold 114 can include a conduit 114c for delivering gas (e.g., ambient air, $O_2$, Ar, $N_2$, or other gases) into the mixing vessel, and a valve 114d positioned along the conduit 114c for regulating the delivery of gas. As shown in FIG. 1, in some cases, the conduit 114c can be in fluid communication with one or more gas sources 122 (e.g., a gas tank) that stores a quantity of gas for use in the system 100. In some cases, an inert gas (e.g., $O_2$, Ar, $N_2$, or air without moisture) can be delivered into the mixing vessel. This can be beneficial, for example, in eliminating or reducing oxidation or hydrolysis of functional groups and/or polymer chains within the system 100.

Further, as shown in FIG. 1, the delivery manifold 114 can include a conduit 114e for delivering one or more solvents (e.g., acetone, iso-propyl alcohol, dichloromethane, hexane, or other solvents) into the mixing vessel, and a valve 114f positioned along the conduit 114e for regulating the delivery of solvent. As shown in FIG. 1, in some cases, the conduit 114e can be in fluid communication with one or more solvent sources 124 (e.g., a storage tank) that stores a quantity of solvent for use in the system 100. Solvents can be used, for example, to flush the mixing vessel, or to assist in maintaining low residue and/or residual content of polymer material being flowed or flushed through the system 100.

The delivery manifold 114 can also remove substances from the mixing chamber 118 of the mixing vessel 104. This can be useful, for example, in removing unwanted substances (e.g., waste materials, waste gases, etc.) from the mixing chamber 118 to facilitate mixing, polymerization, or other aspects of the production process and/or to clean the mixing vessel 104 between uses.

For instance, as shown in FIG. 1, the delivery manifold 114 can include a conduit 114g for removing waste from the mixing vessel 104, and a valve 114h positioned along the conduit 114g for regulating the removal of waste. The conduit 114g can be in fluid communication with a waste stream to facilitate removal from the system 100 and/or the facility housing the system 100.

Figure 2A:
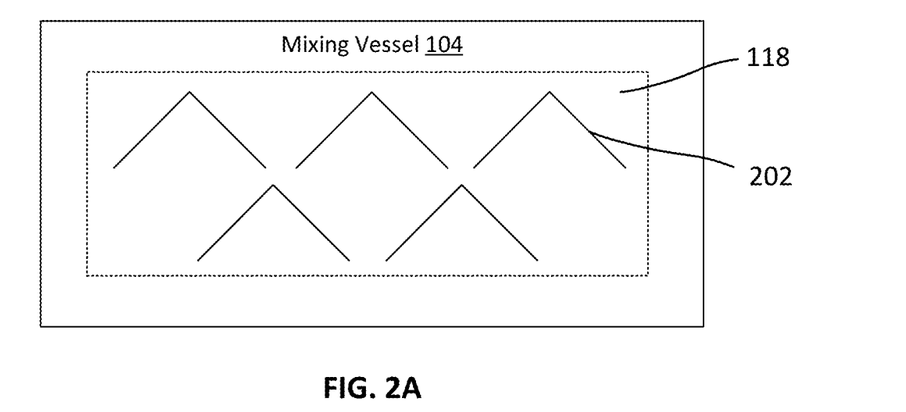
FIGS. 2A-2E are schematic diagrams of example mixing vessels.

In some cases, solvent can be used to flush out the mixing chamber 118 between uses. For example, after a mixture has been formed and dispensed from the mixing chamber 118, a quantity of solvent can be introduced into the mixing chamber 118 via the conduit 114e to dissolve any remnants of the mixture. The solvent and the dissolved mixture can be removed through the conduit 114g, and disposed of In some cases, the mixing vessel 104 can facilitate the mixing of materials using static structures. For example, as shown in FIGS. 2A-2D, a mixing vessel 104 can include various static structures 202 (e.g., walls or baffles) within the mixing chamber 118 that perturb the materials as they flow through the mixing chamber 118. In some cases, static structures can be positioned along the flow path of the conduits 114a into the mixing vessel 104, such that the materials are mixed as they are introduced into the mixing chamber 118. In some cases, static structures can be positioned along the flow path of the mixing chamber 118 towards a conduit 114i, such that the materials are mixed as they exit the mixing chamber 118. Although example static structures 202 are shown in FIGS. 2A2-D, it is understood that these are simplified examples for illustrative purposes. Other static structures 202 as also possible, depending on the implementation.

Figure 2B:
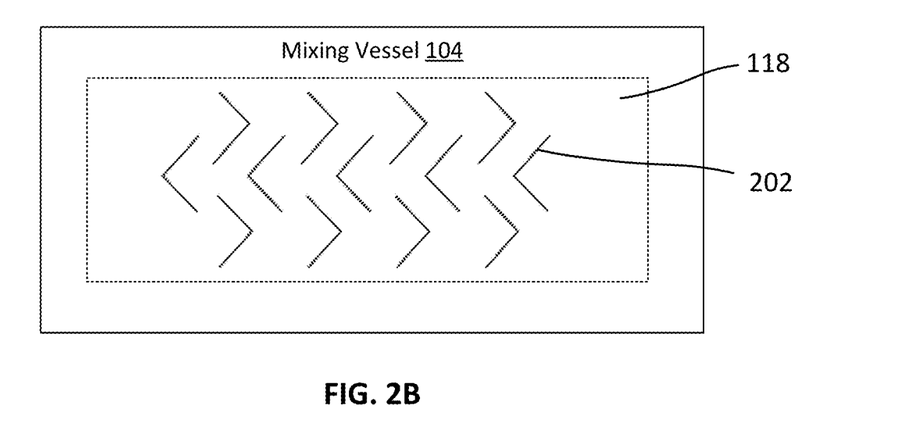
Figure 2C:
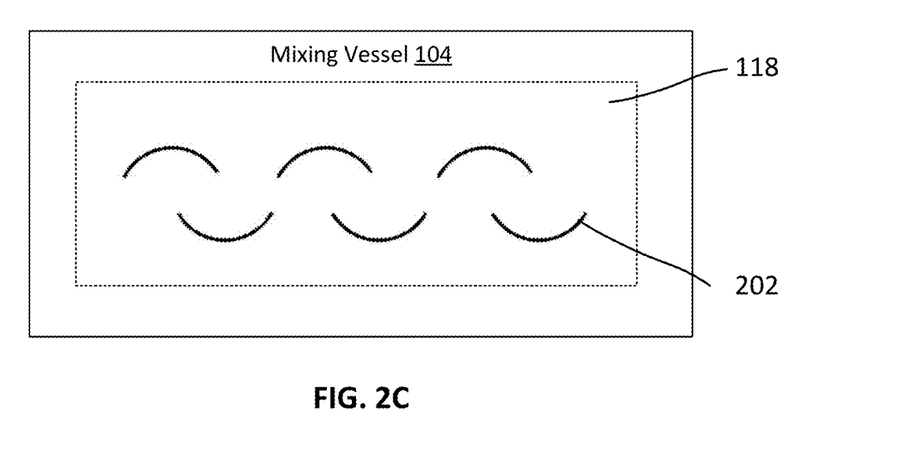
Figure 2D:
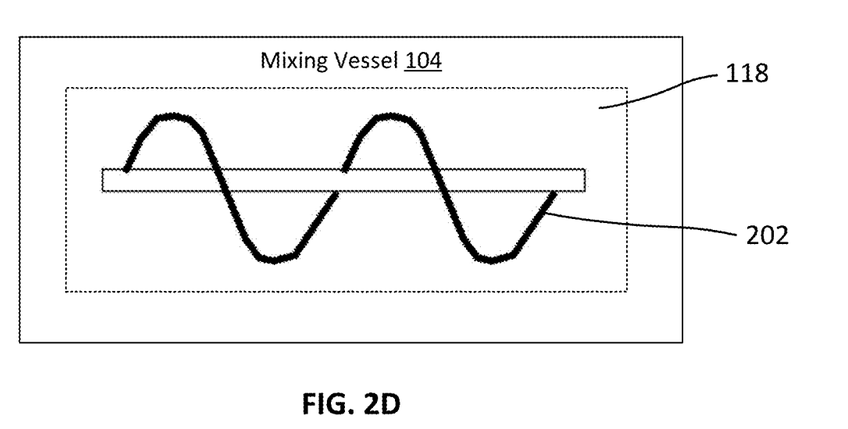
Figure 2E:
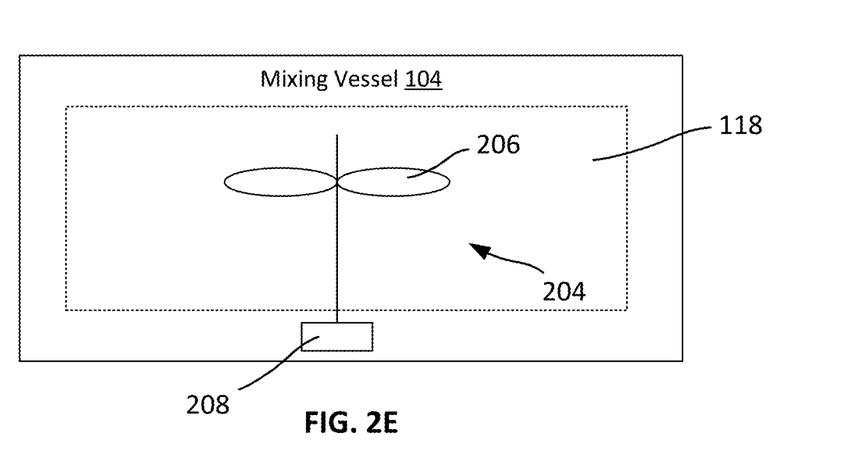

In some cases, the mixing vessel 104 can facilitate the mixing of materials using dynamically moving structures. For example, as shown in FIG. 2E, a mixing vessel 104 can include various dynamically moving structures 204 within the mixing chamber 118 that actively perturb the materials within the mixing chamber 118. For instance, a mixing vessel 104 can include one or more mechanically actuated impellers or agitators that rotate mixing elements 206 (e.g., blades, rotors, bars, etc.) via an actuator 208. Similarly, although example dynamically moving structures 204 are shown in FIG. 2B, it is understood that these are simplified examples. Other dynamically moving structures 204 as also possible, pending on the implementation.

In some cases, a mixing vessel 104 can include both static structures and dynamically moving structures to facilitate mixing of materials within the mixing chamber 118.

In some cases, the static structures and/or the dynamically moving structures can facilitate mixing by agitating and/or introducing turbulence into the materials in the mixing vessel 104. In some cases, this can result in non-laminar flow through the mixing vessel 104, which can increase the degree to which the materials are mixed.

In some cases, the static structures 202 and/or the dynamically moving structures 204 can be coated with one or more layers of material that reduce the amount of material that sticks or clings to them. For example, the static structures 202 and/or the dynamically moving structures 204 can be coated with similar materials as described with respect to the interior surfaces 120 of the mixing chamber 118. This can be beneficial, for example, in improving the mixing process, reducing waste, and increasing the consistency of the resulting polymer articles (e.g., by reducing the amount of material that is stuck to the structures, which can lead to waste and/or inconsistent material mixtures between production runs).

The mixing conditions within the mixing vessel 104 can be precisely regulated. For example, in some cases, the storage temperature within the mixing vessel 104 can be regulated using a temperature control assembly 130 (e.g., a refrigeration unit and/or a heating unit). In some cases, the temperature can be regulated within a range of −40° C. to 400° C. As another example, in some cases, the pressure within the mixing vessel 104 can be regulated using a pressure control system 132 (e.g., a vacuum assembly, a compressor assembly, and/or a valve assembly that regulates the pressure within mixing chamber 118). In some cases, the temperature can be regulated to maintain a pressure differential in the mixing chamber of approximately 10 kPa to 500 kPa relative to the ambient environment.

Regulating the mixing conditions within the mixing vessel 104 can provide various benefits. In some cases, materials mixed according to specific conditions can increase the consistency of the resulting polymer articles (e.g., by reducing or eliminating one or more materials precipitating out of the mixture). Accordingly, the mixture can be used to produce polymer articles having fewer variations or inhomogeneities. As another example, the materials mixed according to specific conditions can be dispensed more easily. For example, the mixture can have a particular viscosity or range of viscosities that enable the materials to be dispensed from the mixing vessel 104 more quickly and/or without requiring a large degree of pressure or force. In some cases, the rate of polymerization of a mixture can be controlled by mixing the materials according to specific conditions. For example, the rate of polymerization can be controlled such that it is not too high (e.g., leaving insufficient time to cast, pattern, cure, or otherwise process the mixture downstream before the mixture becomes overly solidified) or too low (e.g., increasing the production time, and decreasing production yield). Thus, polymer articles can be formed having predictable and precise physical and/or optical properties, even across different manufacturing runs.

In some cases, the delivery manifold 114 also can be used to create low pressure over the surface of the mixture to facilitate removing air or gas bubbles trapped within the mixture prior to dispensing the mixture.

Mixed materials within the mixing vessel can be transferred to the filtering system 106. For example, as shown in FIG. 1, the delivery manifold 114 can include a conduit 114$i$ for delivering mixtures from the mixing vessel 104 to the filtering system 106, and a valve 114$j$ positioned along the conduit 114$i$ for regulating the transfer to the mixture.

The filtering system 106 is configured to filter the mixture. In some cases, the filtering system 106 can include a filtering assembly (e.g., a grid structure having gridded apertures) that collects structures in the mixture that exceed a particular size. For example, in some cases, the filtering assembly can include a grid structure having apertures of 10 µm or less, 1 µm or less, 0.5 µm or less, or 0.1 µm or less along a dimension. Filtering the mixture can improve the consistency of the resulting polymer articles (e.g., by removing inhomogeneities or foreign matter from the mixture).

Although FIG. 1 shows the filtering system 106 positioned between the mixing vessel 104 and the metering system 108, other arrangements are also possible. For example, a filtering system 106 can be placed between one or more of the reservoirs 102 and the mixing vessel 104 to mix materials prior to introduction in the mixing vessel 104. Similarly, a filtering system 106 can be placed between any components of the system 100 to filter the substances being transferred between them. Further, also a single filtering system 106 is shown, in practice, there may be multiple filtering systems 106 positioned at various positions of the system 100 to filter along any point of the system 100.

Filtered materials can be transferred to the metering system 108. For example, as shown in FIG. 1, the delivery manifold 114 can include a conduit 114$k$ for delivering mixtures from the filtering system 106 to the metering system 108, and a valve 114$l$ positioned along the conduit 114$k$ for regulating the transfer to the mixture.

The metering system 108 is configured to dispense a pre-determined amount of the mixture from the filtering system 106 into coating system 110 and/or the casting, patterning, and curing system 112. In turn, the dispensed mixture can be used to coat a mold (e.g., using the coating system 110), and/or to produce a polymer article (e.g., using the casting, patterning, and curing system 112). In some cases, the metering system 108 can be configured to dispense 0.5 ml to 15 ml amount of a mixture. As an example, to produce a polymer eyepiece having a diameter of 100 ml and a thickness of 325 µm, approximately 2.5 ml of the mixture can be dispensed.

The metering system 108 can precisely regulate the dispensing of the mixture via the application of pressure. For instance, in some cases, the metering system 108 can be a pipette-based system, a slot die system, a knife edge coating system, or a syringe pump system.

Figure 3A:
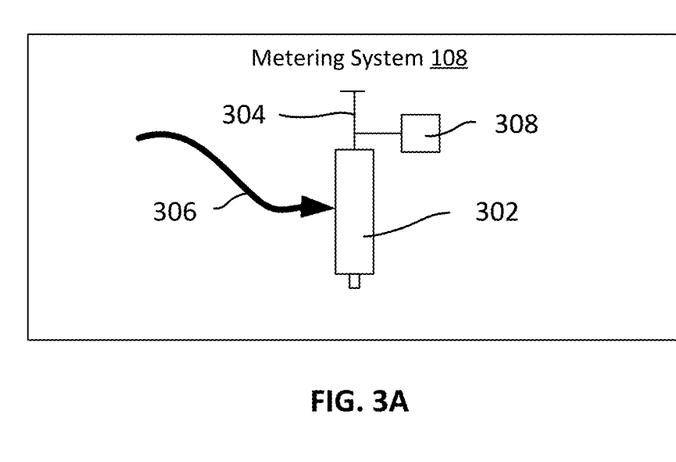
FIGS. 3A and 3B are schematic diagrams of example metering systems.

As an example, a pipette-based metering system 108 is shown in FIG. 3A. The metering system 108 includes a pipette 302, and a plunger 304. A pre-defined volume of the mixture can be suctioned or vacuumed through a feed line 306 and pushed through the pipette 302 using the plunger 304, thereby dispensing a precise volume of the mixture. The operation of the plunger 304 can be controlled, for example, using an actuator 308.

Figure 3B:
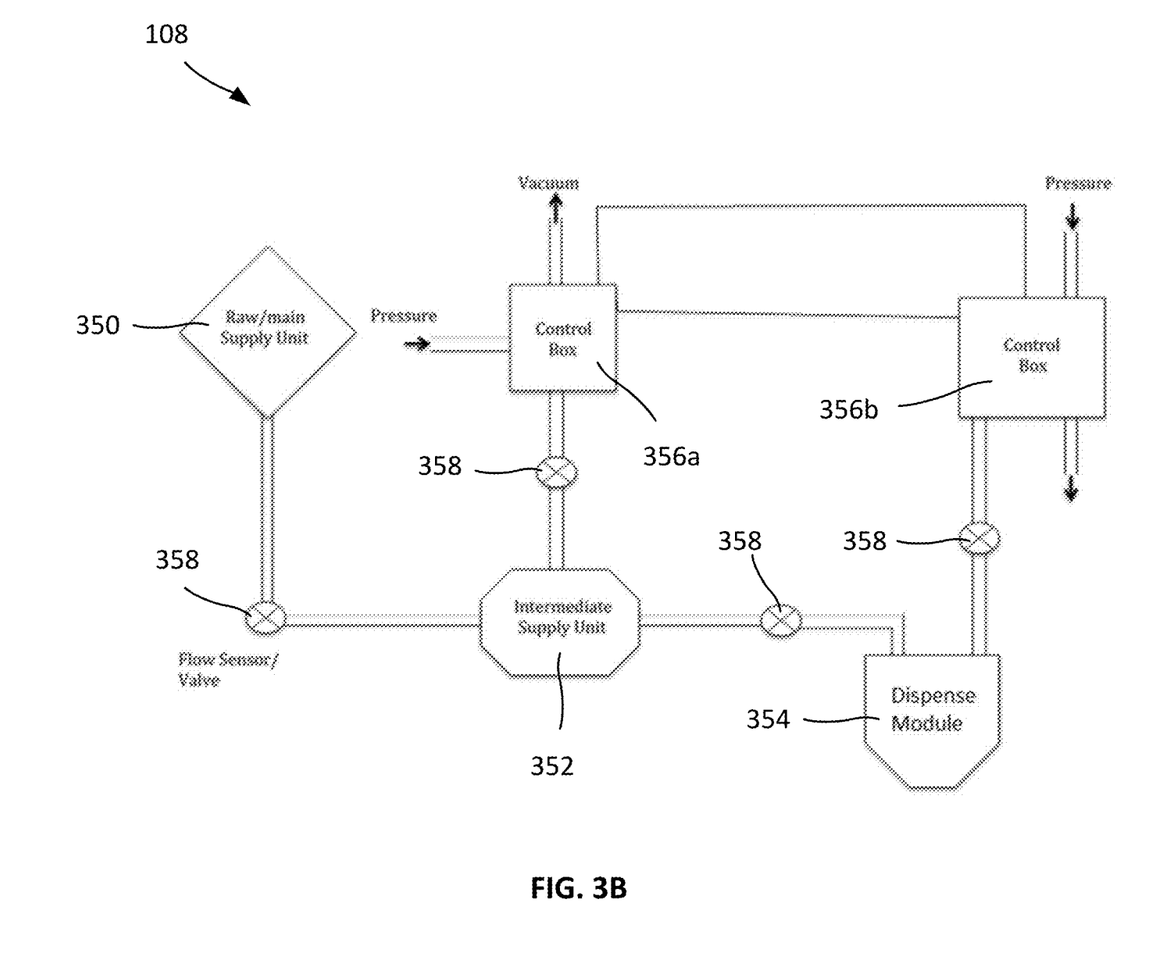

As another example, in addition to dispensing a precise volume, a slot die system or a knife edge system can further pre-spread the fluid to a desired wet thickness if desired. As an example, a slot-die or knife edge metering system 108 is shown in FIG. 3B. Here, the metering system 108 includes a raw/main supply unit 350, an intermediate supply unit 352, a dispense module 354, and control boxes 356$a$ and 356$b$. The raw/main supply unit 350, the intermediate supply unit 352, and the dispense module 354 are in fluid communication with one another, such that a volume of the mixture can flow between them.

The flow of mixture between the components of the metering system 108 is controlled by valves 358 and/or the control boxes 356$a$ and 356$b$. For example, the valves 358 can include flow sensors that measure the rate at which fluids flow through the valves 358. Further, the valves can open or close to regulate the flow rate in response to the measurements. In addition, the control boxes 356$a$ and 356$b$ and selectively apply pressure and/or vacuum to further control the rate at which the mixture flows between particular components of the metering system 108.

In an example usage of the metering system 108, the raw/main supply unit 350 receives the mixture, and feeds a portion of the mixture into the intermediate supply unit 352.

In turn, the intermediate supply unit 352 feeds a regulated amount of the mixture to the dispense module 354 for dispensing/coating. The dispense module 354 can be, for example, a slot-die, knife edge, or a micro gravure system.

The coating system 110 is configured to coat a mold with the mixture. For example, the coating system 110 can dispense a quantity of the mixture onto a mold, and spread the mixture across the mold. As an example, in a slot-die coating system, the mixture can be dispensed via a die at a specific distance away from the substrate (e.g., between approximately 50 µm and 5 mm) while the die is moved relative to the substrate. The mixture can be deposited such that the mixture has a particular thickness (e.g., a "wet" thickness) along the extent of the substrate. For instance, the wet thickness can be between approximately 1 µm and 100

As another example, in a knife-edge coater system, the dispensed mixture can be physically pushed by a flat, smooth, or beveled edge, where the wet thickness of the mixture is governed by the distance of the knife edge from the surface of the substrate.

As another example, in a micro-gravure type coater, a specific amount of the mixture can be applied to applied to the surface of a roller, such that it forms a coating having a specific wet thickness. The roller is then used to transfer the coating to the surface of the substrate (e.g., by directly contacting the roller to the surface of the substrate, or indirectly, such as through the use of one or more additional rollers).

In practice, other coating techniques also can be used, depending on the implementation.

Coating a mold can provide various benefits. For example, coating can be used to pre-spread an uncured multi-component material, and can reduce the risk of trapping bubbles (e.g., during a puddle-type dispense process). In some cases, by coating a mold, the mixture can be selectively distributed to regions of the mold where it is needed. For example, in some cases, certain regions of the mold (e.g., the edges) may need more mixture (e.g., due to dense or larger feature sizes to pattern at those regions). Coating a mold, such as using a slot-die, a knife edge, or a micro-gravure system can facilitate delivery of the mixture to these regions, such that the product can be formed properly.

Regulating the dispensing process can provide various benefits. In some cases, materials can be dispensed more precisely, such that less of the material is wasted during the production processes (e.g., if too much material is dispensed). Further, the consistency of the resulting polymer articles can be increased (e.g., as a consistent amount of material is dispensed for each polymer article, resulting in fewer variations between polymer articles). Further still, this precise regulation can enable the molding of polymer articles with extremely small, precise features. Accordingly, resulting polymer articles exhibit predictable and precise physical and/or optical properties.

Figure 4:
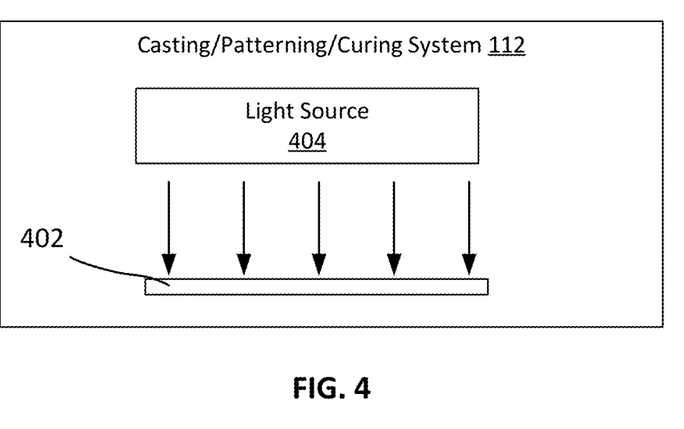
FIG. 4 is a schematic diagram of an example casting, patterning, and curing system.

The casting, patterning, and curing system 112 is configured to casting, patterning, and curing the mixture into a polymer article. As shown in FIG. 4, the casting, patterning, and curing system 112 includes a patterned mold 402 and a light source 404. A quantity of the mixture is dispensed into the mold 402 (e.g., using the metering system 108), and is subsequently cured (e.g., by generating one or more wavelengths of radiation suitable for photocuring the mixture, and directing the light towards the mold 402). This hardens the mixture within the mold 402, resulting in a polymer article (e.g., a polymer film) having a pattern defined by the mold 402. After curing, the polymer article can be extracted from the mold 402 for use.

In some cases, upon mixing of two or more constituent materials (e.g., the mixing of two monomer precursors within the mixing chamber 118), the mixed materials can begin to polymerize, causing the mixed materials to increase in viscosity over time. In some cases, photocurable mixtures can begin to polymerize, even if they are not exposed to light. For example, the mixture can include a particular amounts of a photo-initiator/sensitizer (e.g., 1-15 wt %), an inhibitor (e.g., 1-15 wt %), a UV absorber (e.g., 1-15 wt %), and an anti-oxidant (e.g., 1-15 wt %), and under certain physical conditions (e.g., a temperature of 40° C. to 400° C., and a pressure differential of approximately 10 kPa to 500 kPa relative to the ambient environment), which causes the materials to polymerize over time. In some cases, the mixture can include 0.2-1 wt % of a photo-initiator/sensitizer, 0.2-1 wt % of an inhibitor, 0.2-1 wt % of a UV absorber, and 0.2-1 wt % of an anti-oxidant.

In some cases, it is preferable to dispense the mixture while it still relatively low in viscosity, such that it can be more easily transferred and/or manipulated. For example, when the mixture has a relatively low viscosity, it can be transferred through the delivery manifold 114 more easily. As another example, when the mixture has a relatively low viscosity, it can be used to coat a mold more evenly. As another example, when a mixture having a relatively low viscosity is placed into the mold for curing, the resulting product can be more physically and/or chemically consistent after curing.

In some cases, the metering system 108 can dispense the mixture (e.g., to the coating system 110 to coat a mold and/or to the casting, pattering, and curing system 112 to produce a cured polymer article) while the mixture is still relatively low in viscosity. For example, the metering system 108 can dispense the mixture while the viscosity is approximately 1000 mPa·s (centipoise) or less.

The control module 116 is configured to control the operation of the system 100. For example, the control module 116 can be configured to operate the delivery manifold 114 (e.g., by opening and/or closing one or more of the valves 114b, 114d, 114f, 114h, 114j, and 114l at precise times) to regulate the transfer to materials between the components of the system 100. As another example, the control module 116 can be configured to regulate the physical conditions within the components of the system 100 (e.g., by regulating the temperature and pressure within the reservoirs 102, the mixing vessel 104, etc.). As another example, the control module 116 can be configured to regulate the mold coating process and the casting, patterning, and curing process (e.g., by regulating the dispensing of mixture by the metering system 108, by regulating the operation of the coating system 110, and/or by regulating the photocuring operations of the coating system 110).

In some cases, the control module 116 can regulate the flow of materials through the system 100 based on flow measurements obtained by one or more flow sensors. For example, the system 100 can include one or more flow sensors positioned on or between the reservoirs 102, the mixing vessel 104, the filtering system 106, the metering system 108, the coating system 110, and/or the casting, patterning, and curing system 112. Each flow sensor can measure, for example, the amount of material flowing past the flow sensor and/or the rate at which the material flows past the flow sensor. Based on these measurements, the control module 116 can selectively operate each of the components of the system 100, such that a particular sequence of steps is performed with respect to the materials in the system 100. As an example, the control module 116 can open the valves 114b, and track the flow of materials from reservoirs 102 into the mixing vessel 104 using flow sensors. After a specific amount of each material has been deposited within the mixing vessel 104, the control module 116 can close the valves 114b. Further, once the valves 114b have been closed, the control module 116 can open the valve 114d to deposit inert gas into the mixing vessel 104. In a similar manner, the control module 116 can track the flow of material from the mixing vessel 104 into the filtering system 106, into the metering system 108, into the coating system 110, and/or into the casting, patterning, and curing system 112, such that the material is selectively moved and processed by each component. In some implementations, the control module 116 can be implemented using digital electronic circuitry, or in computer software, firmware, or hardware, or in combinations of one or more of them. For example, the control module 116 can be implemented using one or more computer processors executing one or more computer programs (e.g., one or more modules of computer program instructions, encoded on computer storage medium for execution by, or to control the operation of, the one or more computer processors).

Further, the control module 116 can use various sensors and feedback signals to accurately control the flow through each sub-system of the system 100, and dispense a desired mass of material. For example, given calibrated flow controls under set temperature and pressure conditions, the control module 116 can operate the system 100 such that a given quantity of material is pushed through one or more reservoirs 102 into the mixing vessel 104. Further, the control module 116 can pressurize the fluid line, such that the mixed material is fed into the filtering system 106. A mass flow sensor (e.g., on or near the valve 114*l*) can measure the amount of the mixture passing into the filtering system 106. These measurements can be fed back into a closed loop controller of the control module 116 (e.g., in the form of feedback signals) to correct for any variation in material flow given a set operating pressure and temperature of the fluid delivery line. As the mixture is dispensed onto the substrate, a gravimetric sensor (e.g., connected to the substrate over which the mixture is dispensed/coated) can be used to record the weight of material added over the substrate. This information also can be fed back to the control module 116 (e.g., in the form of feedback signals), such that adjustment can be made as needed (e.g., to correct a variation between the desired amount of material to be dispensed, and an actual amount of material that was dispensed). Further, these feedback signals can be time stamped and/or recorded to estimate, for example, the stepped or sequential delivery of material individually from each reservoir to the mixing chamber and through to the final dispense subsystem.

In some cases, the control module 116 can be manually controlled by a user. For example, in some cases, the control module 116 can be configured to receive user commands (e.g., from a user interface), and operate each of the components of the system 100 in accordance with the user commands.

In some cases, the control module 116 can automatically control some or all of the operations of the system 100. For example, in some cases, the control module 116 can be configured to automatically dispense materials into the mixing vessel, mix the materials, filter the materials, dispense the materials onto a mold, coating the mold, and/or cure the materials without human intervention. In some cases, the control module 116 can be pre-programmed (e.g., by a user) to perform a particular sequence of operations using user intervention.

In some cases, the control module 116 can repeat one or more operations to produce a number of polymer articles (e.g., a multiple identical polymer articles). In some cases, the control module 116 can repeat one or more operations in a similar, but not identical manner (e.g., using different materials, different processing conditions, etc.) to produce a number of different polymer articles.

The system 100 enables polymer articles to produced according to precisely regulated production conditions are precisely regulated. For instance, polymer articles can be produced using specific amounts of constituent materials stored under specific physical conditions. Further, the constituent materials can be combined in a precisely regulated manner. This precise regulation can provide precise volumes of highly homogenous mixtures under conditions such that the mixtures are suitable for molding polymer articles with extremely small, precise features. Accordingly, the implementations disclosed herein can be used for repeatedly forming polymer articles that exhibit predictable and precise physical and/or optical properties. In some cases, polymer films produced in this manner can diffract light in a more predictable and consistent manner, and thus, may be more suitable for use a high resolution optical imaging system. In some cases, optical imaging systems using these polymer films can produce sharper and/or higher resolution images than might otherwise be possible with other polymer films. Moreover, production of such polymer films using the disclosed systems can techniques can offer higher yields with less production line downtime than conventional techniques.

Figure 5A:
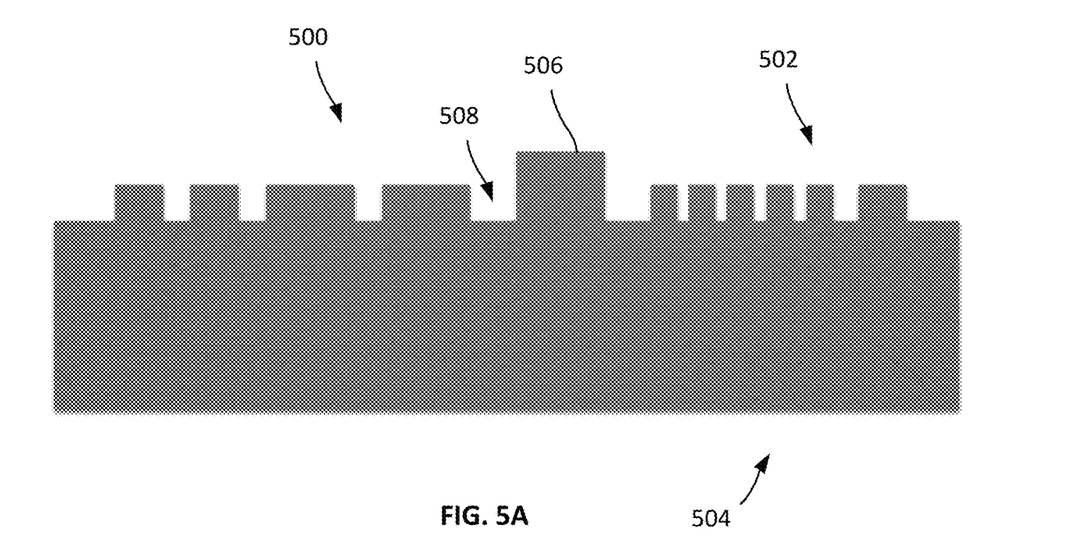
FIGS. 5A and 5B are diagrams of example polymer articles.

An example polymer article 500 is shown in FIG. 5. In this example, the polymer article 500 is a monolithic, optically transparent photonic film suitable for use as an eyepiece in a VR or AR system. The polymer article 500 includes a patterned first surface 502 and a flat second surface 504. The patterned first surface 502 has protrusions 506 and recessions 508. The protrusions 506 and the recessions 508 may be uniform or vary in dimensions. The protrusions 506 are nanostructures, microstructures, or a combination thereof. The polymer article 500 has a residual layer thickness r in the range of 10 µm to 1 cm. As used herein, "residual layer thickness" refers to the minimum distance between the first surface of the polymer article and the second surface of the polymer article.

Figure 5B:
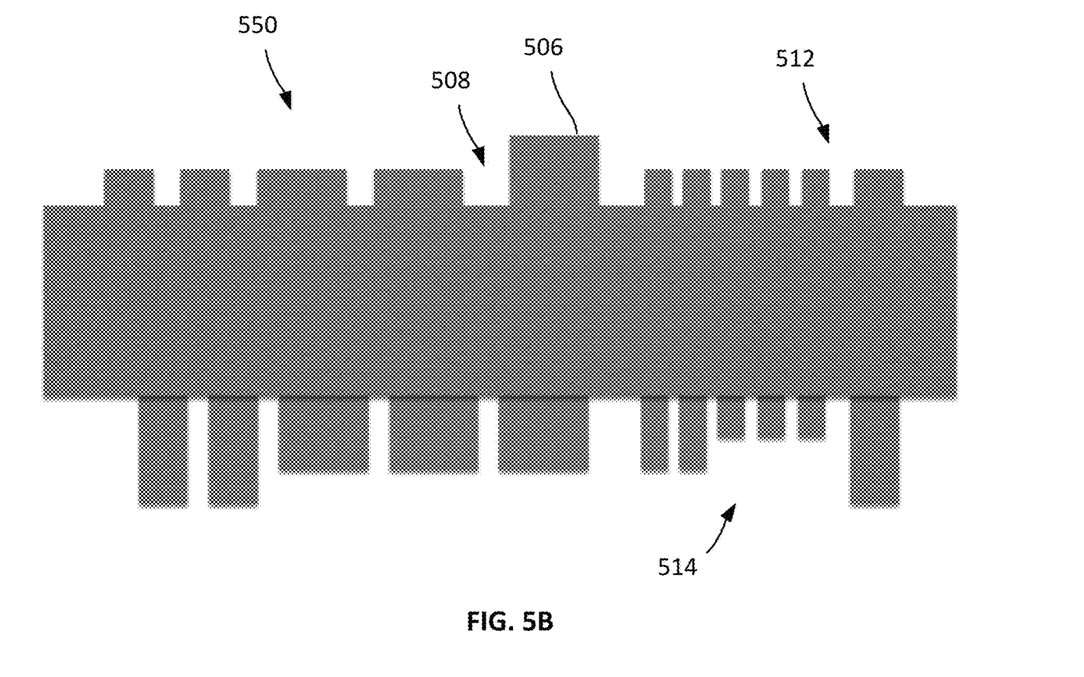

FIG. 5B depicts another exemplary polymer article 550. The polymer article 550 is also a monolithic, optically transparent photonic film suitable for use as an eyepiece in a VR or AR system. The polymer article 550 has a patterned first surface 512 and a patterned second surface 514. The patterned first surface 512 and the patterned second surface 514 have protrusions 506 and recessions 508. The protrusions 506 and the recessions 508 may be uniform or vary in dimensions. The protrusions 506 are nanostructures, microstructures, or a combination thereof. The polymer article 550 has a residual layer thickness r in the range of 10 µm to 1 cm.

Other example polymer articles are described in U.S. Pat. App. No. 62/502,973, filed May 8, 2017.

Figure 6:
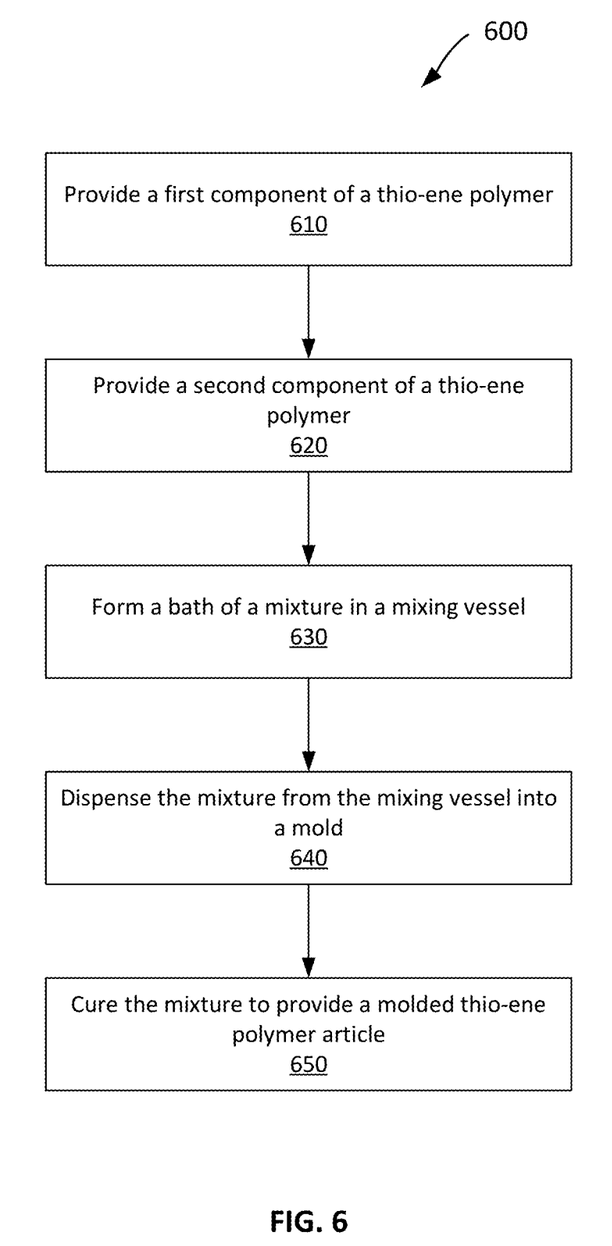
FIG. 6 is a flow chart diagram of an example process for producing polymer articles.

An example process 600 of making a molded polymer article is shown in FIG. 6. In some cases, the process 600 can be used to produce a thiol-ene optical polymer film. Implementations of the process 600 can be performed, for example, using the system 100 shown and described with respect to FIG. 1.

A first component of a thiol-ene polymer is provided (step 610). The first component can include a first polymerizable compound (e.g., a monomer precursor).

A second component of the thiol-ene polymer is also provided (step 620). The second component can include a second polymerizable compound (e.g., another monomer precursor that polymerizes when combined and/or photo-cured with the first monomer precursor).

A batch of a mixture is formed in a mixing vessel (step 630). The mixture includes metered amounts of the first and second components. The mixture is formed under conditions sufficient to cause a chemical reaction between the first and second polymerizable compounds in the mixture such that a viscosity of the mixture increases over time. As an example, the mixture can be formed using the mixing vessels 104 shown and described with respect to FIGS. 1, 2A, and 2B.

While the mixture's viscosity is below 1000 mPa·s, the mixture is dispensed from the mixing vessel into a mold (step 640). As an example, the mixture can be dispensed using the metering system 108 shown and described with respect to FIGS. 1 and 3.

The mixture in the mold is cured to provide a molded thiol-ene polymer article (step 650). As an example, the mixture can be cured using the casting, patterning, and curing system 112 shown and described with respect to FIGS. 1 and 4.

In some cases, the mixing vessel can be flushed (e.g., with a solvent) to remove residue of the mixture after dispensing the mixture.

In some cases, a second batch of the mixture can be formed. The second batch can include metered amounts of the first and second components in the mixing vessel under conditions sufficient to cause a chemical reaction between the first and second polymerizable compounds in the mixture such that a viscosity of the mixture increases over time. While the mixture's viscosity is below 1000 mPa·s, the mixture can be dispensed from the mixing vessel into the mold. The mixture can subsequently be cured in the mold to provide a second molded thiol-ene polymer article.

In some cases, more than three constituent materials can be used to produce a polymer article. For example, a third component of a thiol-ene polymer can be provided, and the mixture can be formed by combining a metered amount of the third component with the first and second components in the mixing vessel.

In some cases, forming the batch of the mixture under conditions sufficient to cause the chemical reaction can include maintaining the mixing vessel at a temperature within a range from −40° C. to 400° C. In some cases, forming the batch of the mixture under conditions sufficient to cause the chemical reaction comprises can include maintaining the mixing vessel at a pressure differential of approximately 10 kPa to 500 kPa.

In some cases, the mixture can be dispensed by coating at least a portion of the mold with the mixture (e.g., using the coating system 110).

In some cases, the produced thiol-ene polymer can have a refractive index of 1.55 or more, and can be used in variation sensitive applications (e.g., as part of eyepieces in an optical imaging system).

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable sub-combination. Further, it is understood that various modifications may be made without departing from the spirit and scope of the invention. Accordingly, other implementations are within the scope of the following claims.

What is claimed is:

1. A system for mixing components and dispensing a mixture for forming a thiol-ene polymer article, the system comprising:
   a first reservoir containing a first component of the thiol-ene polymer comprising a first polymerizable compound;
   a second reservoir containing a second component of the thiol-ene polymer comprising a second polymerizable compound;
   a solvent reservoir containing a solvent;
   a gas reservoir containing an inert gas;
   a mixing vessel having a mixing chamber;
   a delivery manifold providing a conduit for each of the first component from the first reservoir, the second component from the second reservoir, the solvent from the solvent reservoir, and the inert gas from the gas reservoir to the mixing vessel;
   a dispensing manifold providing a conduit for fluid from the mixing vessel; and
   a control module in communication with the delivery manifold and the dispensing manifold, the control module being programmed to, during operation of the system:
      cause the delivery manifold to deliver a metered amount of the first component from the first reservoir and a metered amount of the second component from the second reservoir into the mixing chamber of the mixing vessel to form a mixture comprising the metered amounts of the first and second components in the mixing vessel under conditions sufficient to cause a chemical reaction between the first and second polymerizable compounds in the mixture such that a viscosity of the mixture increases over time,
      subsequent to causing the delivery manifold to deliver the metered amount of the first component from the first reservoir and the metered amount of the second component from the second reservoir into the mixing chamber of the mixing vessel, cause the delivery manifold to deliver the inert gas from the gas reservoir into the mixing vessel,
      while the mixture's viscosity is below 1000 mPa·s, to cause the dispensing manifold to dispense the mixture from the mixing vessel into a mold
      subsequent to causing the dispensing manifold to dispense the mixture from the mixing vessel, cause the delivery manifold to deliver the solvent into the mixing vessel to flush the mixing vessel.

2. The system of claim 1, further comprising one or more additional reservoirs each containing a corresponding component of the thiol-ene polymer, each reservoir being connected to the mixing vessel by the delivery manifold, wherein the control module is further programmed to cause the delivery of a metered amount of each of the components of the thiol-ene polymer from their corresponding reservoir to the mixing chamber to form the mixture during operation of the system.

3. The system of claim 2, wherein the control module is programmed to cause the delivery manifold to sequentially deliver each of the components to the mixing chamber.

4. The system of claim 2, wherein the control module is programmed to cause the delivery manifold to deliver the first and second components to the mixing chamber before delivering any additional components.

5. The system of claim 2, wherein the control module is programmed to cause the delivery manifold to simultaneously deliver each of the components to the mixing chamber.

6. The system of claim 1, wherein the mixing chamber has a hydrophobic surface.

7. The system of claim 6, wherein the hydrophobic surface is provided by a layer of PTFE, polypropylene, polydimethylsiloxane, fluorosilane polymers, micro-textured polycarbonate, or parylene.

8. The system of claim 6, wherein the hydrophobic surface is provided by a layer of a silicone material.

9. The system of claim 1, wherein the mixing vessel comprises a surface formed from a material comprising a compound comprising at least one non-polar alkyl group, at least one non-polar aryl group, at least one non-polar fluoride group, or a combination thereof.

10. The system of claim 1, wherein the mixing vessel comprises an agitator for facilitating mixing of the mixture during operation of the system.

11. The system of claim 10, wherein the control module is in communication with the agitator and programmed to control the operation of the agitator during operation of the system.

12. The system of claim 1, wherein the delivery manifold comprises a filtration subsystem arranged to filter the first and/or second components prior to their delivery into the mixing chamber.

13. The system of claim 1, wherein the dispensing manifold comprises a filtration subsystem arranged to filter the mixture prior to dispensing the mixture into the mold.

14. The system of claim 1, further comprising a heater arranged to maintain a temperature in the mixing chamber within a range from −40° C. to 400° C.

15. The system of claim 1, further comprising a pump arranged to maintain a pressure differential in the mixing chamber of approximately 10 kPa to 500 kPa.

* * * * *